(12) United States Patent
Bagnall

(10) Patent No.: US 7,014,145 B2
(45) Date of Patent: Mar. 21, 2006

(54) VARIABLE POSITION INTAKE FOR AN AIRCRAFT MOUNTED GAS TURBINE ENGINE

(75) Inventor: Adam M Bagnall, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/083,224

(22) Filed: Mar. 18, 2005

(65) Prior Publication Data

US 2006/0016932 A1      Jan. 26, 2006

Related U.S. Application Data

(62) Division of application No. 10/379,658, filed on Mar. 6, 2003, now Pat. No. 6,945,494.

(30) Foreign Application Priority Data

Mar. 15, 2002   (GB) .................................... 0206139

(51) Int. Cl.
*B64D 33/02*   (2006.01)

(52) U.S. Cl. ........................ 244/53 B; 244/55
(58) Field of Classification Search .............. 244/53 R, 244/53 B, 55, 23 B, 23 D; 137/15.2, 15.1
See application file for complete search history.

(56) References Cited

U.S. PATENT DOCUMENTS

| 4,899,958 A | * | 2/1990 | Horikawa | .................. 244/53 B |
| 6,634,595 B1 | * | 10/2003 | Koncsek et al. | .......... 244/53 B |

* cited by examiner

*Primary Examiner*—Peter M. Poon
*Assistant Examiner*—Timothy D. Collins
(74) *Attorney, Agent, or Firm*—W. Warren Taltavull; Manelli Denison & Selter PLLC

(57) ABSTRACT

An aircraft (10) comprises a wing (12) having an upper surface (16) and a lower surface (18) and at least one turbofan gas turbine engine (20) mounted on the wing (12). The axis (34) of the at least one turbofan gas turbine engine (20) is arranged substantially in the plane (14) of the wing (12) of the aircraft (10). The at least one turbofan gas turbine engine (20) has an intake, the intake comprising a hollow member (44) rotatably mounted coaxially with the at least one turbofan gas turbine engine (20) such that in use the hollow member (44) is rotatable between a first position, a low-speed condition, in which air flowing over and/or above the upper surface (16) of the wing (12) flows into the intake of the at least one turbofan gas turbine engine (20) and a second position, a high-speed condition, in which air flowing along and/or below the lower surface (18) of the wing flows into the intake of the at least one turbofan gas turbine engine.

18 Claims, 6 Drawing Sheets

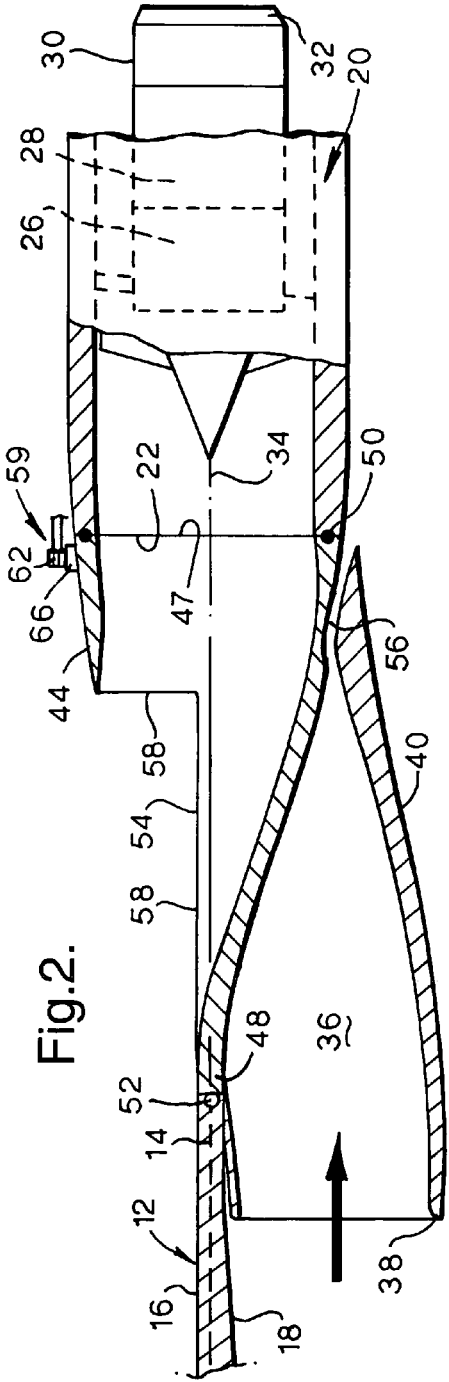
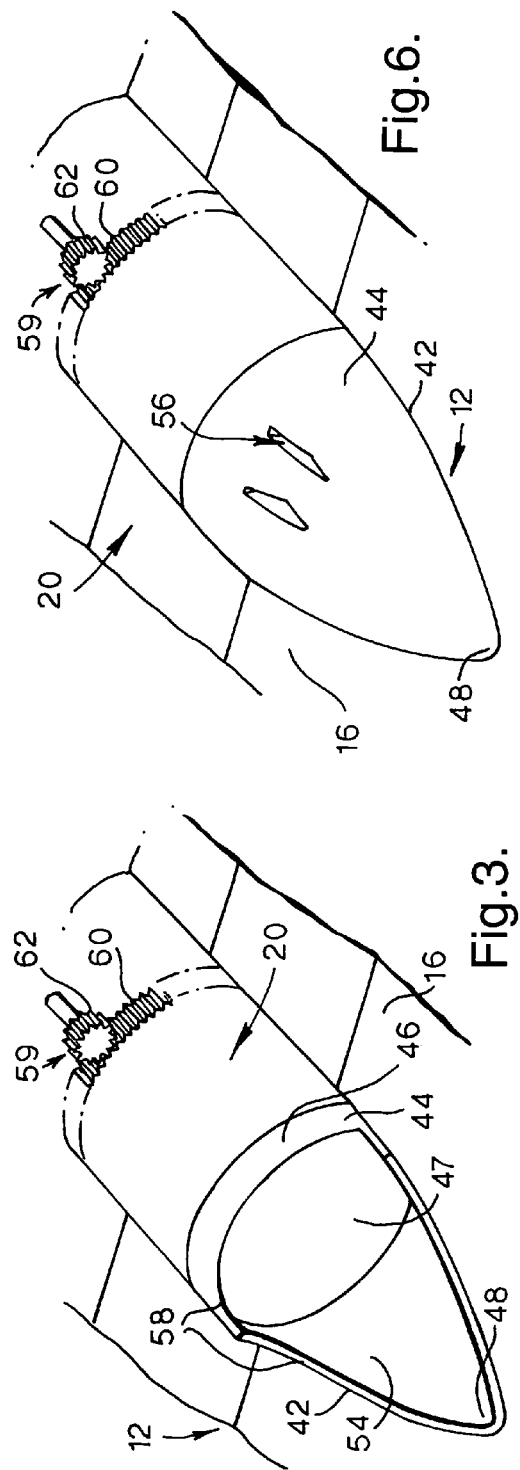

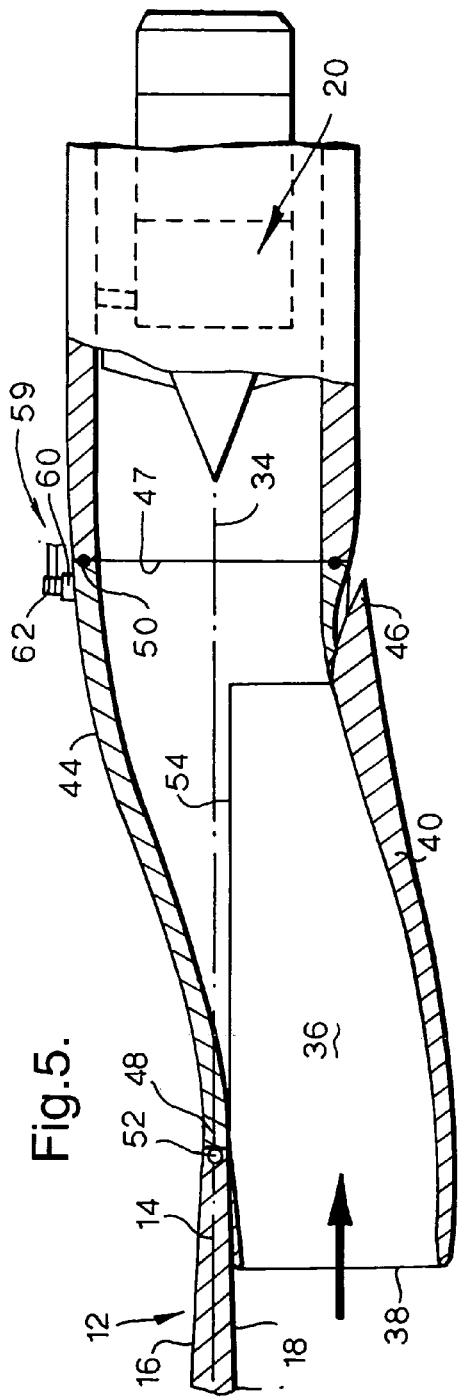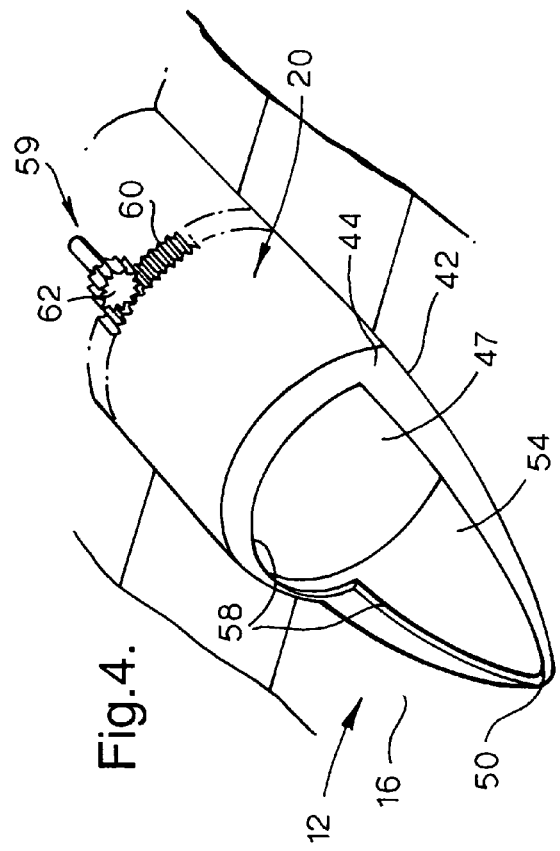

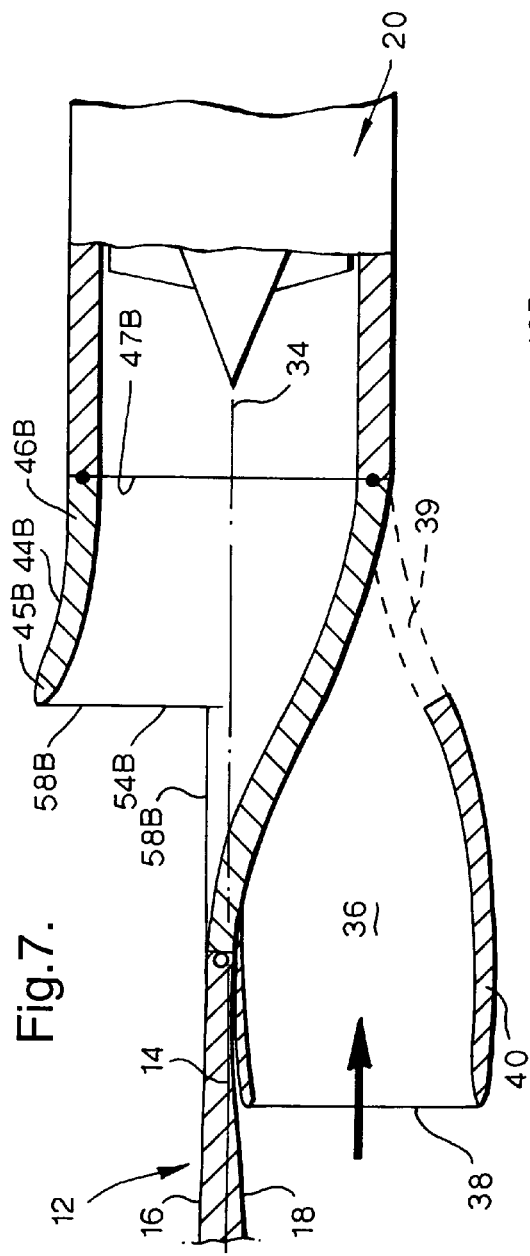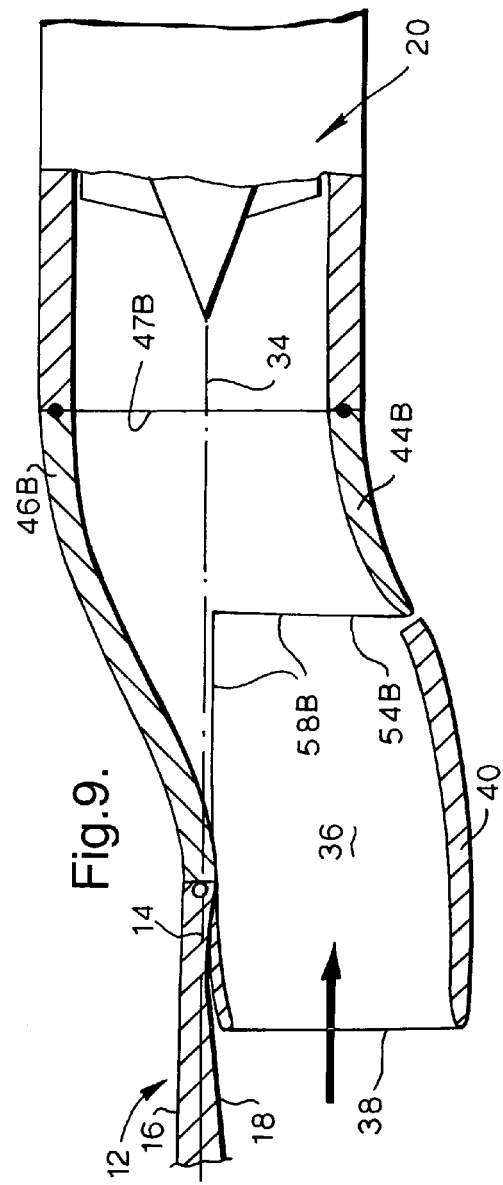

VARIABLE POSITION INTAKE FOR AN AIRCRAFT MOUNTED GAS TURBINE ENGINE

This is a Divisional of National application Ser. No. 10/379,658 filed Mar. 6, 2003, now U.S. Pat. No. 6,945,494.

FIELD OF THE INVENTION

The present invention relates to a variable position intake for an aircraft mounted gas turbine engine. The present invention relates in particular to a variable position intake for an aircraft mounted turbofan gas turbine engine.

BACKGROUND OF THE INVENTION

An aircraft mounted gas turbine engine requires an intake to provide a smooth path for the flow of air into the gas turbine engine. The main requirement of the intake is to supply air to the gas turbine engine, under all operating conditions, with minimum loss of energy. The air must be supplied to the gas turbine engine fan and/or compressor at uniform pressure distributed evenly across the whole of the intake area.

At high-speed cruise conditions the airflow velocity into the gas turbine engine is slower than the speed of the aircraft. In the case of a gas turbine engine with an intake mounted under the aircraft wing and at the downstream end of the aircraft wing the lift provided by the aircraft wing helps to reduce the velocity of the air entering the gas turbine engine because of the higher pressure under the aircraft wing, which slows down the air flow in front of the intake mounted under and at the downstream end of the aircraft wing. An intake mounted under and at the downstream end of the aircraft wing interacts favourably with the aircraft wing at high-speed cruise conditions. The intake mounted under and at the downstream end of the aircraft wing requires a relatively small area inlet with relatively sharp lips to reduce spillage drag.

At low speed conditions the airflow velocity into the gas turbine engine is faster than the speed of the aircraft. In the case of a gas turbine engine with an intake mounted over the aircraft wing and at the downstream end of the aircraft wing the lift provided by the aircraft wing helps to increase the velocity of the air entering the gas turbine engine because of the lower pressure over the aircraft wing, which speeds up the air flow in front of the intake mounted over and at the downstream end of the aircraft wing. An intake mounted over and at the downstream end of the aircraft wing interacts favourably with the aircraft wing at low-speed conditions. The intake mounted over and at the downstream end of the aircraft wing requires a relatively large area inlet with relatively thick lips to guide the air into the gas turbine engine at very low speeds.

On the ground, it may be necessary to shield the gas turbine engine intake from ingestion of debris thrown up from the undercarriage of the aircraft. An intake mounted over the aircraft wing provides shielding of the gas turbine engine intake.

Thus, it is clearly seen that different types of intake are required for different applications and/or different flight conditions. It is clear that a high-speed aircraft ideally requires a different intake to that required for a low-speed aircraft or an aircraft on the ground. A high-speed aircraft requires a sharp-lipped intake mounted under the aircraft wing. A low-speed aircraft requires a large thick-lipped intake-mounted over the aircraft wing.

A typical prior art solution to the problem provides an intake configured for cruise and auxiliary intakes for low speed operation and additional blocker doors to prevent foreign objects entering the intake. This prior art compromises the aerodynamic flow conditions into the fan and/or the compressor, which may induce aerodynamic instability and unacceptable stresses into components of the gas turbine engine.

SUMMARY OF THE INVENTION

Accordingly the present invention seeks to provide a novel intake for an aircraft mounted gas turbine engine, which reduces, preferably overcomes, the above-mentioned problems.

Accordingly the present invention provides an aircraft comprising a wing having an upper surface and a lower surface, at least one gas turbine engine mounted on the aircraft, the at least one gas turbine engine having an inlet, an intake for supplying air to the inlet of the at least one gas turbine engine, the intake comprising a movable hollow member such that in use the hollow member is movable between a first position in which air flowing over and/or above the upper surface of the wing flows through the hollow member and into the inlet of the at least one gas turbine engine and a second position in which air flowing along and/or under the lower surface of the wing flows through the hollow member and into the inlet of the at least one gas turbine engine.

Preferably the axis of the at least one gas turbine engine being arranged substantially in the plane of the wing of the aircraft, the intake comprising a hollow member rotatably mounted coaxially with the at least one gas turbine engine such that in use the hollow member is rotatable between a first position in which air flowing over and/or above the upper surface of the wing flows through the hollow member and into the inlet of the at least one gas turbine engine and a second position in which air flowing along and/or under the lower surface of the wing flows through the hollow member and into the inlet of the at least one gas turbine engine.

Preferably the hollow member has a cylindrical base portion.

The hollow member may be a hollow pseudo axis-symmetrical member. Preferably the hollow member is a hollow pseudo conical member, the hollow pseudo conical member has an aperture in one region and an aperture in the cylindrical base portion of the hollow pseudo conical member. Alternatively the hollow member is a hollow pseudo part elliptical member, the hollow pseudo elliptical member has an aperture in one region and an aperture in the cylindrical base portion of the hollow pseudo elliptical member.

Alternatively the hollow member may have an outwardly flared portion, the hollow has an aperture in one region and an aperture in the cylindrical base portion of the hollow member.

Preferably the aperture in the region of the hollow member has rounded edges.

Preferably the hollow member is rotatably mounted on the gas turbine engine. Preferably the base portion of the hollow member is rotatably mounted on the gas turbine engine by a bearing.

Preferably the hollow member is rotatably mounted on the wing of the aircraft. Preferably the hollow member is rotatably mounted on the wing of the aircraft by a bearing.

Preferably the bearing is a roller bearing or a ball bearing.

Preferably the intake duct comprises an intake duct portion under the lower surface of the wing. Preferably the intake duct portion is defined by the lower surface of the wing and a wall positioned under the lower surface of the wing.

Preferably the wing has an aperture, the hollow member is rotatably mounted in the aperture in the wing.

The hollow member may have at least one groove on its outer surface.

The present invention also provides an aircraft comprising a wing having an upper surface and a lower surface, at least one gas turbine engine mounted on the aircraft, the axis of the at least one gas turbine engine being arranged substantially in the plane of the wing of the aircraft, the at least one gas turbine engine having an inlet, an intake for supplying air to the inlet of the at least one gas turbine engine, the intake comprising a hollow member rotatably mounted coaxially with the at least one gas turbine engine such that in use the hollow member is rotatable between a first position in which air flowing over and/or above the upper surface of the wing flows through the hollow member and into the inlet of the at least one gas turbine engine and a second position in which air flowing along and/or under the lower surface of the wing flows through the hollow member and into the inlet of the at least one gas turbine engine.

The present invention also provides a gas turbine engine having an inlet and an intake for supplying air to the inlet, the intake comprising a movable hollow member such that in use the hollow member is movable between a first position in which air flowing over a first sector upstream of the intake flows through the hollow member and into the inlet of the at least one gas turbine engine and a second position in which air flowing over a second angularly spaced sector upstream of the intake flows through the hollow member and into the inlet of the at least one gas turbine engine.

Preferably the intake comprising a hollow member rotatably mounted coaxially with the at least one gas turbine engine such that in use the hollow member is rotatable between a first position in which air flowing over a first sector upstream of the intake flows through the hollow member and into the inlet of the at least one gas turbine engine and a second position in which air flowing over a second angularly spaced sector upstream of the intake flows through the hollow member and into the inlet of the at least one gas turbine engine.

Preferably the hollow member has a cylindrical base portion.

The hollow member may be a hollow pseudo axis-symmetrical member. Preferably the hollow member is a hollow pseudo conical member, the hollow pseudo conical member has an aperture in one region and an aperture in the cylindrical base portion of the hollow pseudo conical member. Alternatively the hollow member is a hollow pseudo part elliptical member, the hollow pseudo elliptical member has an aperture in one region and an aperture in the cylindrical base portion of the hollow pseudo elliptical member.

Alternatively the hollow member has an outwardly flared portion, the hollow has an aperture in one region and an aperture in the cylindrical base portion of the hollow member.

Preferably the aperture in the region of the hollow member has rounded edges.

Preferably the hollow member is rotatably mounted on the gas turbine engine. Preferably the base portion of the hollow member is rotatably mounted on the gas turbine engine by a bearing. Preferably the bearing is a roller bearing or a ball bearing.

Preferably the hollow member has at least one groove on its outer surface.

Preferably the hollow member is rotated through 180° between the first position and the second position.

Preferably the gas turbine engine is a turbofan gas turbine engine.

The present invention also provides a gas turbine engine having an inlet and an intake for supplying air to the inlet, the intake comprising a hollow member rotatably mounted coaxially with the at least one gas turbine engine such that in use the hollow member is rotatable between a first position in which air flowing over a first sector upstream of the intake flows through the hollow member and into the inlet of the at least one gas turbine engine and a second position in which air flowing over a second angularly spaced sector upstream of the intake flows through the hollow member and into the inlet of the at least one gas turbine-engine.

BRIEF DESCRIPTION OF THE DRAWINGS

The present invention will be more fully described by way of example with reference to the accompanying drawings in which:

FIG. 2 is an enlarged longitudinal cross-sectional view through the axis of the gas turbine engine showing the intake and an aircraft wing shown in FIG. 1 in a low-speed condition.

FIG. 3 is an enlarged perspective view of the upper surface of the aircraft wing and intake shown in FIG. 2 in a low-speed condition.

FIG. 4 is an enlarged perspective view of the upper surface of the aircraft wing and intake shown in FIG. 2 in transition from a low-speed condition to a high-speed condition.

FIG. 5 is an enlarged longitudinal cross-sectional view through the axis of the gas turbine engine showing the intake and an aircraft wing shown in FIG. 2 in a high-speed condition.

FIG. 6 is an enlarged perspective view of the upper surface of the aircraft wing and intake in FIG. 2 in a high-speed condition.

FIG. 7 is an enlarged alternative longitudinal cross-sectional view through the axis of the gas turbine engine showing the intake and an aircraft wing shown in FIG. 1 in a low-speed condition.

FIG. 9 is an enlarged alternative longitudinal cross-sectional view through the axis of the gas turbine engine showing the intake and an aircraft wing shown in FIG. 7 in a high-speed condition.

DETAILED DESCRIPTION OF THE INVENTION

Figure 1:
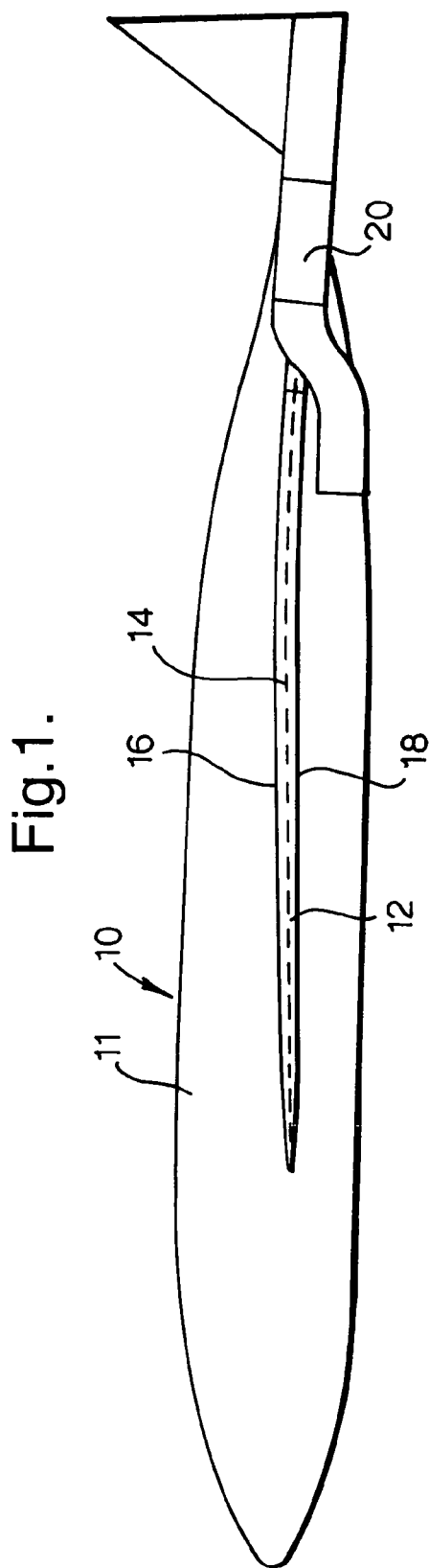
FIG. 1 shows an aircraft mounted gas turbine engine having an intake according to the present invention.

An aircraft 10 comprising a fuselage 11, and a pair of wings 12 is shown in FIG. 1. The wings 12 have a centre line 14, an upper surface 16 and a lower surface 18. The aircraft 10 has a plurality of turbofan gas turbine engines 20 mounted on the wings 12 of the aircraft 10 or on the fuselage 11 of the aircraft 10.

Each turbofan gas turbine engine 20, as shown in FIG. 2, comprises in flow series an inlet 22, a fan section 24, a compressor section 26, a combustion section 28, a turbine section 30 and an exhaust 32. The turbofan gas turbine engine 20 has an axis of rotation 34. The operation of the turbofan gas turbine engine 20 is quite conventional and its operation will not be discussed further.

Each turbofan gas turbine engine 20 is mounted on a respective wing 12 of the aircraft 10 such that the axis 34 of the turbofan gas turbine engine 20 is substantially in the centre line 14, or plane, of the respective wing 12. Additionally the inlet 22 of each turbofan gas turbine engine 20 is positioned towards the downstream end of the respective wing 12.

With reference to FIGS. 2 to 6, each turbofan gas turbine engine 10 has a main intake duct 36 positioned under the respective wing 12 of the aircraft 10. The main intake duct 36 has an intake plane 38 positioned at a mid region of the wing 12. The main intake duct 36 is defined by a peripheral wall 40 and in this example the main intake duct is circular in cross-section. The peripheral wall 40 of the main intake duct 40 is spaced from the lower surface 18 of the wing 12 at the intake plane 38 but the peripheral wall 40 blends into the lower surface 18 of the wing 12 at a suitable distance downstream of the intake plane 38.

The wing 12 of the aircraft 10 has a symmetrically shaped, in this example a substantially triangular shaped, aperture 42 arranged immediately upstream of the inlet 22 of the turbofan 20. The line of symmetry of the symmetrically shaped aperture 42 is collinear with the axis 34 of the turbofan gas turbine engine 20.

A hollow pseudo axis-symmetrical member, in this example a hollow pseudo substantially conical member, 44 is arranged immediately upstream of the inlet 22 of the turbofan 20 and the hollow pseudo conical member 44 is arranged in the aperture 42 in the wing 12 of the aircraft 10. The axis of symmetry of the hollow pseudo conical member 44 is arranged collinear with the line of symmetry of the aperture 42 and collinear with the axis 34 of the turbofan gas turbine engine 20.

The hollow pseudo conical member 44 comprises a circular base portion 46 and an apex 48. The circular base portion 46 has a circular aperture 47 and the circular base portion 46 is rotatably mounted on the upstream end of the turbofan gas turbine engine 20 by a bearing 50. The apex 48 of the hollow pseudo conical member 44 is rotatably mounted on the wing 12 of the aircraft 10 by a bearing 52. The hollow pseudo conical member 44 also comprises an aperture 54 and one or more longitudinally extending grooves 56 on the outer surface of the hollow pseudo conical member 44.

It is to be noted that the two dimensional shape of the hollow pseudo conical member 44.1s substantially the two dimensional shape of the aperture 42 in the wing 12 and that the dimensions of the hollow pseudo conical member 44 are substantially the same as those of the aperture 42 in the wing 12 of the aircraft 10 such that there is substantially no, or a minimum amount of, leakage of air through the aperture 42 between the hollow pseudo conical member 44 and the edge of the aperture 42.

There are means 59 to rotate the hollow pseudo conical member 44 through 180° between a first position and a second position. In this example the means 59 comprises a toothed rack 60 on the hollow pseudo conical member 44 and a pinion gear 62 meshing with the toothed rack 60. Rotation of the pinion gear 62 causes the toothed rack 60 and hollow pseudo conical member to rotate between the first position and the second position. The means 59 may also comprise any suitable actuation means for example a pneumatic ram, a hydraulic ram, an electrical ram, a screw jack or a worm drive.

There are means 58 to rotate the hollow pseudo conical member 44 through 180° between a first position and a second position. In this example the means 58 comprises a toothed rack 60 on the hollow pseudo conical member 44 and a pinion gear 62 meshing with the toothed rack 60. Rotation of the pinion gear 62 causes the toothed rack 60 and hollow pseudo conical member to rotate between the first position and the second position. The means 58 may also comprise any suitable actuation means for example a pneumatic ram, a hydraulic ram, an electrical ram, a screw jack or a worm drive.

In use the hollow pseudo conical member 44 is positioned in the first position, as shown in FIGS. 2 and 3, for operation of the aircraft 10 at low-speeds and on the ground and in use the hollow pseudo conical member 44 is positioned in the second position, as shown in FIGS. 5 and 6, for operation of the aircraft 10 at cruise and high speeds. FIG. 4 shows the hollow pseudo conical member 44 at a position between the first position and the second position.

When the hollow pseudo conical member 44 is in the first position the aperture 54 is aligned with the aperture 42 in the wing 12 of the aircraft 10 and allows air flowing over and/or above the upper surface 16 of the wing 12 to flow smoothly into the hollow pseudo conical member 44 though the aperture 47 and thence to the inlet 22 of the turbofan gas turbine engine 20. The aperture 54 of the hollow pseudo conical member 44 has rounded edges 58, which define generously proportioned intake lips for a relatively large intake over the upper surface 16 of the wing 12 of the aircraft 10. The hollow pseudo conical member 44 prevents the air flowing along and/or below the lower surface 18 of the wing 12 and through the intake duct 36 to the inlet 22 of the turbofan gas turbine engine 20. Any foreign objects, or debris, entering the intake duct 36 flow through the grooves 56 and out of the intake duct 36, to prevent damage to the turbofan gas turbine engine 20.

When the hollow pseudo conical member 44 is in the second position the aperture 54 is aligned with the aperture 42 in the wing 12 of the aircraft 10 and allows air flowing below the lower surface 16 of the wing 12 to flow smoothly into the hollow pseudo conical member 44 through the aperture 47 and thence to the inlet 22 of the turbofan gas turbine engine 20. Thus the hollow pseudo conical member 44 defines a sealed intake for air flowing from the intake duct 36 to the inlet 22 of the gas turbine engine 20 and hence the hollow pseudo conical member 44 prevents the air flowing over and/or above the upper surface 18 of the wing 12 to the inlet 22 of the turbofan gas turbine engine 20.

In an alternative embodiment each turbofan gas turbine engine 20, as shown in FIG. 7, comprises in flow series an inlet 22, a fan section 24, a compressor section 26, a combustion section 28, a turbine section 30 and an exhaust 32. The turbofan gas turbine engine 20 has an axis of rotation 34. The operation of the turbofan gas turbine engine 20 is quite conventional and its operation will not be discussed further.

Each turbofan gas turbine engine 20 is mounted on a respective side of the fuselage 11 of the aircraft 10 such that the axis 34 of the turbofan gas turbine engine 20 is substantially in the centre line 14, or plane, of the respective wing 12. Additionally the inlet 22 of each turbofan gas turbine engine 20 is positioned towards the downstream end of the respective wing 12.

With reference to FIGS. 7 to 10, each turbofan gas turbine engine 10 has a main intake duct 36 positioned under the respective wing 12 of the aircraft 10. The main intake duct 36 has an intake plane 38 positioned at a mid region of the wing 12. The main intake duct 36 is defined by a peripheral wall 40 and in this example the main intake duct is circular in cross-section. The peripheral wall 40 of the main intake duct 40 is spaced from the lower surface 18 of the wing 12 at the intake plane 38 but the peripheral wall 40 blends into the lower surface 18 of the wing 12 at a suitable distance downstream of the intake plane 38.

The wing 12 of the aircraft 10 has a symmetrically shaped, in this example a triangular shaped, aperture 42B arranged immediately upstream of the inlet 22 of the turbofan 20. The aperture 42B also comprises two notches 43B extending from the triangular shaped aperture 42B. The line of symmetry of the symmetrically shaped aperture 42B is collinear with the axis 34 of the turbofan gas turbine engine 20.

A hollow member 44B is arranged immediately upstream of the inlet 22 of the turbofan 20 and the hollow member 44B is arranged in the aperture 42 in the wing 12 of the aircraft 10. The axis of symmetry of the hollow member 44B is arranged collinear with the line of symmetry of the aperture 42B and collinear with the axis 34 of the turbofan gas turbine engine 20.

The hollow member 44B comprises a circular base portion 46B and an apex 48B. The circular base portion 46B has a circular aperture 47B and the circular base portion 46B is rotatably mounted on the upstream end of the turbofan gas turbine engine 20 by a bearing 50B. The apex 48B of the hollow member 44B is rotatably mounted on the wing 12 of the aircraft 10 by a bearing 52B. The hollow member 44B comprises an aperture 54B and an outwardly flared portion 45B. The hollow member 44B also has projections 45B of substantially the same shape and size as the notches 43B.

It is to be noted that the two dimensional shape of the hollow member 44B is substantially the two dimensional shape of the aperture 42B in the wing 12 and that the dimensions of the hollow member 44B are substantially the same as those of the aperture 42B in the wing 12 of the aircraft 10 such that there is substantially no, or a minimum amount of, leakage of air through the aperture 42B between the hollow member 44B and the edge of the aperture 42B.

There are means 58B to rotate the hollow pseudo conical member 44B through 180° between a first position and a second position. In this example the means 58 comprises a toothed rack 60 on the hollow pseudo conical member 44 and a pinion gear 62 meshing with the toothed rack 60. Rotation of the pinion gear 62 causes the toothed rack 60 and hollow pseudo conical member to rotate between the first position and the second position. The means 58 may also comprise any suitable actuation means for example a pneumatic ram, a hydraulic ram, an electrical ram, a screw jack or a worm drive.

Figure 8:
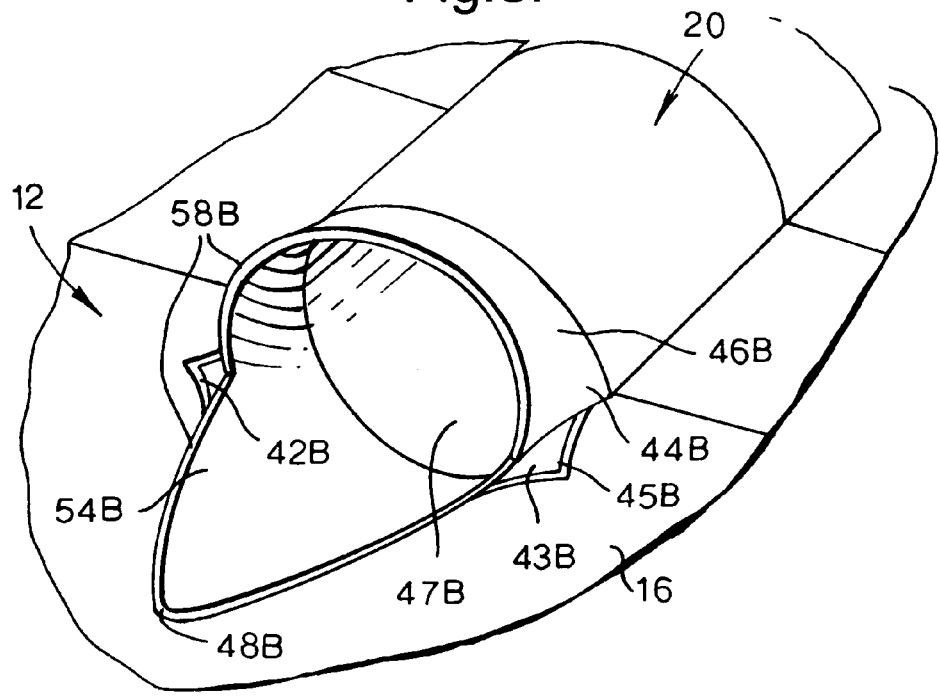
FIG. 8 is an enlarged perspective view of the upper surface of the aircraft wing and intake shown in FIG. 7 in a low-speed condition.
Figure 10:
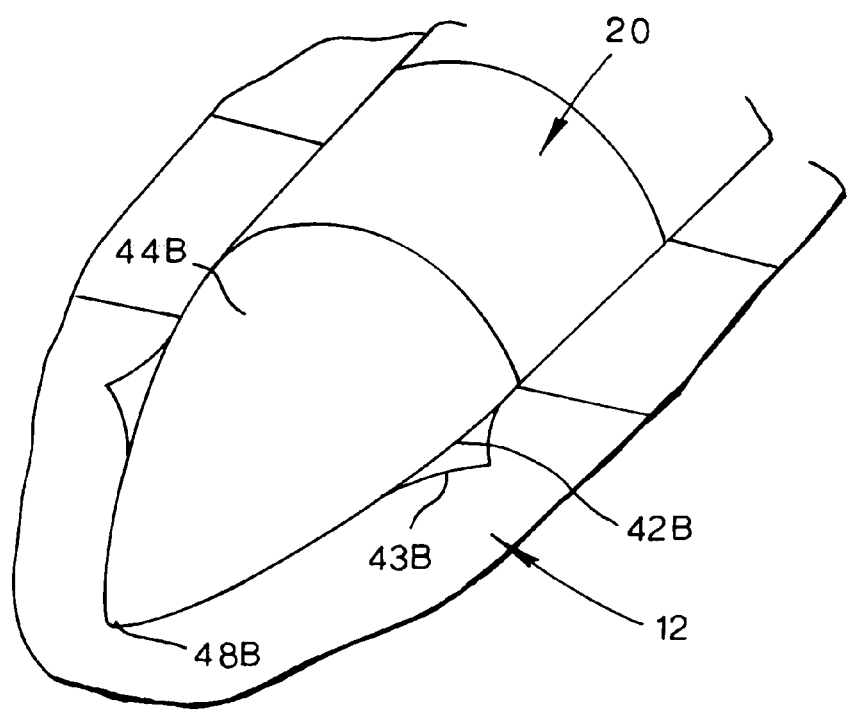
FIG. 10 is an enlarged perspective view of the upper surface of the aircraft wing and intake shown in FIG. 9 in a high-speed condition.

In use the hollow member 44B is positioned in the first position, as shown in FIGS. 7 and 8, for operation of the aircraft 10 at low-speeds and on the ground and in use the hollow member 44B is positioned in the second position, as shown in FIGS. 9 and 10, for operation of the aircraft 10 at cruise and high speeds.

When the hollow member 44B is in the first position the aperture 54B is aligned with the aperture 42B in the wing 12 of the aircraft 10 and allows air flowing over and/or above the upper surface 16 of the wing 12 to flow smoothly into the hollow member 44B through the aperture 47B and thence to the inlet 22 of the turbofan gas turbine engine 20. The outwardly flared portion 45B and the aperture 54B of the member 44B have rounded edges 58B which define a generously proportioned intake lips for a relatively large intake over the upper surface 16 of the wing 12 of the aircraft 10. The hollow member 44B prevents the air flowing along and/or below the lower surface 18 of the wing 12 and through the intake duct 36 to the inlet 22 of the turbofan gas turbine engine 20. Any foreign objects, or debris, entering the intake duct 36 flow through the open end 39 and out of the intake duct 36, to prevent damage to the turbofan gas turbine engine 20. Additionally the open end 39 allows a flow of air through the intake duct 36 during low-speed operation of the aircraft 10 to minimise the drag penalty of the intake duct 36 in the low-speed operation of the aircraft 10.

When the hollow member 44B is in the second position the aperture 54B is aligned with the aperture 42 in the wing 12 of the aircraft 10 and allows air flowing along and/or below the lower surface 16 of the wing 12 to flow smoothly through the intake duct 36, into the hollow member 44B through the aperture 47B and thence to the inlet 22 of the turbofan gas turbine engine 20. The outwardly flared portion 45B of the hollow member 44B is aligned with and forms a continuation of the wall 38 of the intake duct 36. Thus the hollow pseudo conical member 44B defines a sealed intake for air flowing from the intake duct 36 to the inlet 22 of the gas turbine engine 20 and hence the hollow member 44B prevents the air flowing over and above the upper surface 18 of the wing 12 to the inlet 22 of the turbofan gas turbine engine 20. The notches 43 are provided in the aperture 42 to allow the outwardly flared portion 45B of the hollow member 44B to be rotated.

Figure 11:
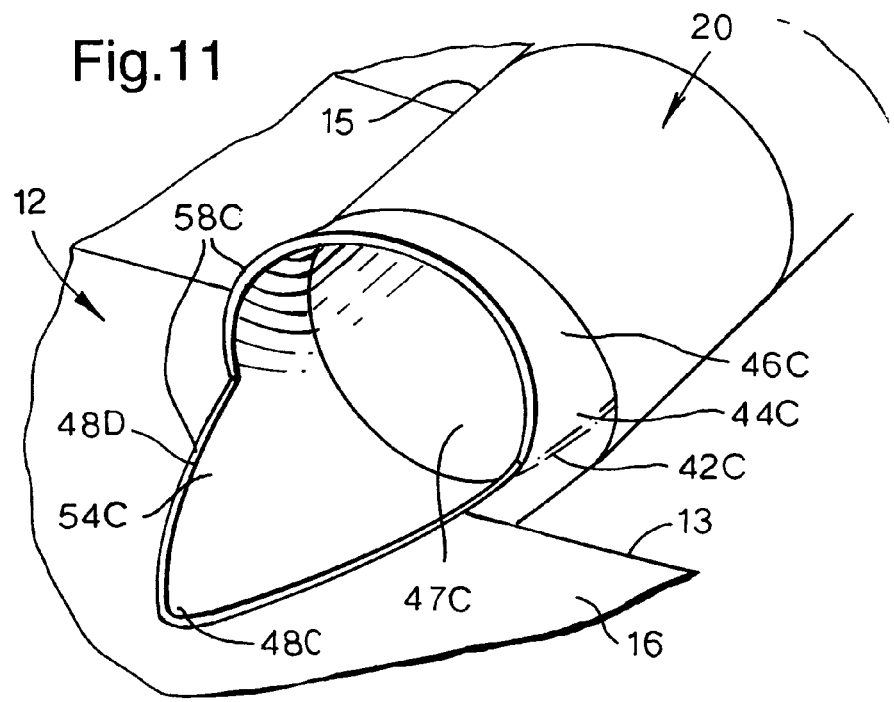
FIG. 11 is an alternative enlarged perspective view of the upper surface of the aircraft wing and intake shown in FIG. 7 in a low-speed condition.
Figure 12:
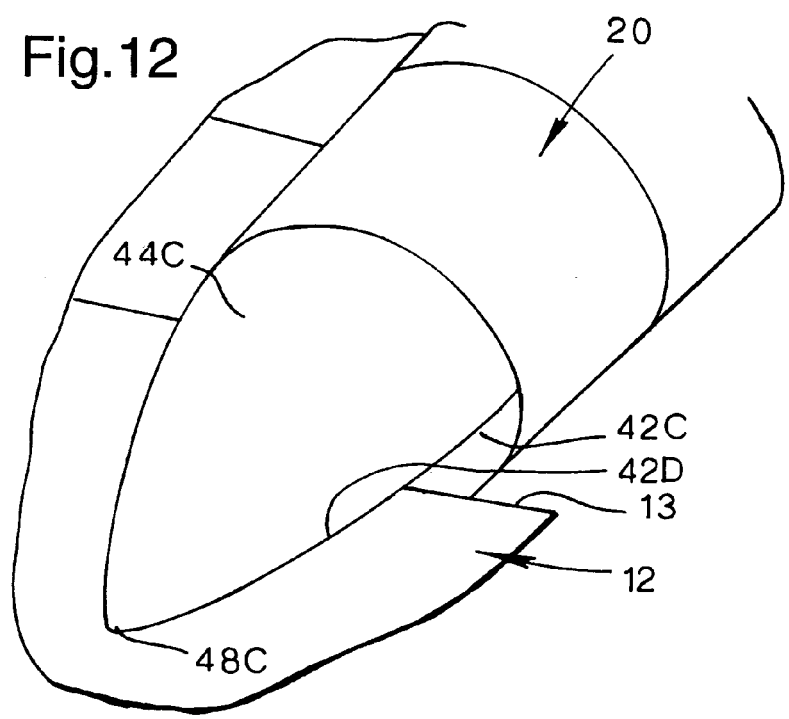
FIG. 12 is an alternative enlarged perspective view of the upper surface of the aircraft wing and intake shown in FIG. 9 in a high-speed condition.

FIGS. 11 and 12 show alternative perspective views to FIGS. 8 and 10 respectively. In FIGS. 11 and 12 the trailing edge 13 of the wing 12 has a step 15 and the gas turbine engine 20 is located at the step 15 in the trailing edge 13 of the wing 12, such that the inlet 22 is located downstream of the trailing edge 13 of the wing 12. The intake plane 38 is located upstream of the trailing edge 13 of the wing 12 and the hollow member 44C is located in a space 42C between the trailing edge 13 of the wing 12 and a cut out 42D in the trailing edge 13 of the wing 12. The step 15 in the trailing edge 13 of the wing 12 also allows the hollow member 44C to rotate around one side of the turbofan gas turbine engine 20, so that the notches are not required, to allow movement of the hollow member 44C between the first position and the second position.

The hollow member may also comprise a hollow pseudo elliptical member, which has an aperture in one region and an aperture at the base portion of the hollow pseudo conical member.

Thus the hollow member 44, 44B, 44C is rotatable between a first position in which air flowing over a first sector, or first upper half, upstream of the intake flows into the inlet 22 of the turbofan gas turbine engine 20 and a second position in which air flowing over a second angularly spaced sector, or second lower half, upstream of the intake flows into the inlet 22 of the turbofan gas turbine engine 20.

Thus the present invention provides an aircraft mounted turbofan gas turbine engine with a nearly optimum over wing intake for low-speed and/or ground operation and a nearly optimum under wing intake for high-speed and/or cruise operation.

Although the present invention has been described with reference to a turbofan gas turbine engine it is equally applicable to a turbojet gas turbine engine or other aircraft mounted gas turbine engine.

Although the present invention has been described with reference to an intake at a mid region of the wing, it may be at a downstream region of the wing or any other suitable position of the wing as long as there is a portion of the wing upstream of the intake. Although the present invention has been described with reference to an inlet at a downstream region of the wing, it may be at a mid region of the wing or any other suitable position of the wing as long as there is a portion of the wing upstream of the inlet.

One or more of the gas turbine engines on the aircraft may have intake ducts comprising hollow members according to the present invention.

What is claimed is:

1. A gas turbine engine having an inlet and an intake for supplying air to the inlet, the intake comprising a movable hollow member such that in use the hollow member is movable relative to said inlet between a first position in which air flowing over a first surface upstream of the intake flows through the hollow member and into the inlet of the at least one gas turbine engine and a second position in which air flowing over a second angularly-spaced surface upstream of the intake flows-through the hollow member and into the inlet of the at least one gas turbine engine.

2. A gas turbine engine as claimed in claim 1 wherein, the intake comprising a hollow member rotatably mounted coaxially with the at least one gas turbine engine such that in use the hollow member is rotatable between a first position in which air flowing over a first surface upstream of the intake flows through the hollow member and into the inlet of the at least one gas turbine engine and a second position in which air flowing over a second angularly spaced surface upstream of the intake flows through the hollow member and into the inlet of the at least one gas turbine engine.

3. A gas turbine engine as claimed in claim 2 wherein the hollow member has a cylindrical base portion.

4. A gas turbine engine as claimed in claim 3 wherein the hollow member is a hollow pseudo axis-symmetrical member.

5. A gas turbine engine as claimed in claim 4 wherein the hollow member is a hollow pseudo conical member, the hollow pseudo conical member has an aperture in one region and an aperture in the cylindrical base portion of the hollow pseudo conical member.

6. A gas turbine engine as claimed in claim 4 wherein the hollow member is a hollow pseudo part elliptical member, the hollow pseudo elliptical member has an aperture in one region and an aperture in the cylindrical base portion of the hollow pseudo elliptical member.

7. A gas turbine engine as claimed in claim 3 wherein the hollow member has an outwardly flared portion, the hollow has an aperture in one region and an aperture in the cylindrical base portion of the hollow member.

8. A gas turbine engine as claimed in claim 5 wherein the aperture in the region of the hollow member has rounded edges.

9. A gas turbine engine as claimed in claim 2 wherein the hollow member is rotatably mounted on the gas turbine engine.

10. A gas turbine engine as claimed in claim 3 wherein the base portion of the hollow member is rotatably mounted on the gas turbine engine by a bearing.

11. A gas turbine engine as claimed in claim 10 wherein the bearing is a roller bearing or a ball bearing.

12. A gas turbine engine as claimed in claim 2 wherein the hollow member has at least one groove on its outer surface.

13. A gas turbine engine as claimed in claim 1 wherein the hollow member is rotated through 180° between the first position and the second position.

14. A gas turbine engine as claimed in claims 1 wherein the gas turbine engine is a turbofan gas turbine engine.

15. An aircraft comprising a wing having an upper surface and a lower surface, at least one gas turbine engine mounted on the aircraft, the at least one gas turbine engine having an inlet, an intake for supplying air to the inlet of the at least one gas turbine engine, the intake comprising a movable hollow member such that in use the hollow member is movable between a first position in which air flowing over or above the upper surface of the wing flows through the hollow member and into the inlet of the at least one gas turbine engine and a second position in which air flowing along or under the lower surface of the wing flows through the hollow member and into the inlet of the at least one gas turbine engine wherein the axis of the at least one gas turbine engine being arranged substantially in the plane of the wing of the aircraft, the intake comprising a hollow member rotatable mounted coaxially with the at least one gas turbine engine such that in use the hollow member is rotatable between a first position in which air flowing over or above the upper surface of the wing flows through the hollow member and into the inlet of the at least one gas turbine engine and a second position in which air flowing along or under the lower surface of the wing flows through the hollow member and into the inlet of the at least one gas turbine engine wherein the hollow member is a hollow pseudo axis-symmetrical member and has a cylindrical base portion and is a hollow pseudo part elliptical member, the hollow pseudo elliptical member has an aperture in one region and an aperture in the cylindrical base portion of the hollow pseudo elliptical member.

16. An aircraft as claimed in claim 15 wherein the hollow member is rotatably mounted on the wing of the aircraft.

17. An aircraft as claimed in claim 16 wherein the hollow member is rotatably mounted on the wing of the aircraft by a bearing.

18. An aircraft as claimed in claim 15 wherein each of the gas turbine engines has a movable hollow member.

* * * * *